UNITED STATES PATENT OFFICE.

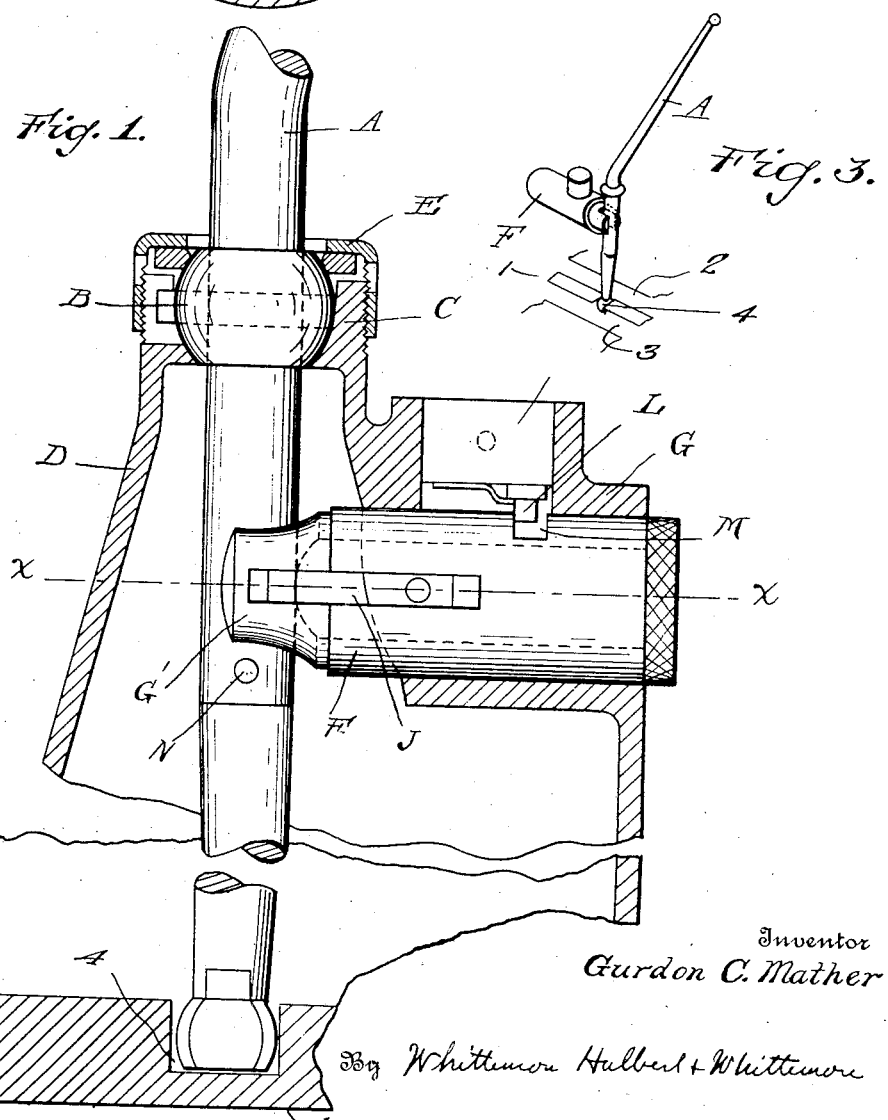

GURDON C. MATHER, OF DETROIT, MICHIGAN.

GEAR-SHIFT LOCK.

1,349,973.   Specification of Letters Patent.   Patented Aug. 17, 1920.

Application filed March 26, 1917. Serial No. 157,425.

*To all whom it may concern:*

Be it known that I, GURDON C. MATHER, a citizen of the United States of America, residing at Detroit, in the county of Wayne and State of Michigan, have invented certain new and useful Improvements in Gear-Shift Locks, of which the following is a specification, reference being had therein to the accompanying drawings.

The invention relates to locking mechanism designed for use upon motor vehicles, and the invention consists in the novel construction for locking the gear-shift mechanism as hereinafter set forth.

In the drawings:

Figure 1 is a longitudinal section through a portion of the gear housing showing the shifting lever and the locking mechanism applied thereto;

Fig 2 is a horizontal section on line $x$—$x$ Fig. 1;

Fig. 3 is a diagrammatic view showing the shifting lever locked in engagement with the guide for the lower end thereof.

My invention is applicable to various types of gear-shifting mechanism, but as specifically illustrated is applied to that type employing a universally-pivoted control lever. As shown, A is the lever having the spherical portion B seated in a spherical socket-member C at the upper end of the gear housing D, and retained to its seat by the cap member E having a threaded engagement with the housing. Below the spherical portion B the lever extends downward into the housing and coöperates with suitable shifter mechanism, not shown. The lower end of the control lever engages in a guide 1, such as the ordinary H guide having the parallel slots 2 and 3 and the transverse slot 4 intermediate the ends of the parallel slots. The construction is such that when the gears are in neutral position, the control lever can only be shifted sidewise through the transverse slot 4 and into either of the parallel slots 2 and 3 when it is shifted either forward or backward to shift the gears.

To effectively lock the mechanism, I have provided means for engaging the lever and preventing the sidewise movement. This comprises a locking bar F laterally slidably engaging a bearing G, which is formed at one side of the gear housing D and is preferably integral therewith. The bar F has a bifurcated end G' for embracing the lever A, the furcations operating to lock said lever from lateral movement in either direction. The bar F is preferably hollow and has housed therein the spring H, which at one end bears upon a cross-pin I passing through a longitudinal slot J in the bar and bearing G therefor. The opposite end of the spring bears against the rear end of the bar and is under sufficient tension to yieldably press the bar in a direction to retract the bifurcation G' from engagement with the lever. K is a key-actuated lock of any standard construction, located in a recess in the bearing G and having a bolt L yieldably pressed outward but retracted by the operation of the key. The bar F is provided with a recess M so positioned that when the bifurcation G' is in full engagement with the lever A, said recess M will be in registration with the bolt L, which will automatically engage the same. When thus engaged the bar F is held from longitudinal movement and will effectually lock the lever. On the other hand, when the key is operated to retract the bolt L, the tension of the spring H will at once retract the bar F, disengaging the bifurcation G' and permitting the lever to be operated.

With the construction as thus far described, it might be possible to operate the lever A by first removing the cap E and then lifting the lever so as to disengage it from the bifurcation G'. Such an operation is prevented by providing a pin or lug N on the lever A below the bifurcation G', and which operates to hold the lever from any vertical movement. The same result may be obtained by any suitable shouldered engagement between the locking bar and lever.

What I claim as my invention is:

1. The combination with a gear housing and a control lever fulcrumed thereon and projecting therein, of a bar sidable in a bearing in said housing in a direction transverse to the plane of initial movement of said lever from its neutral position, the inner end of said bar being below the fulcrum for the control lever and bifurcated to embrace said lever and the outer end of the bar projecting without the casing, a lock for engaging said bar when pressed inward to hold the same in locking engagement with the lever, and means upon said lever and extending transversely thereof beneath and adapted to engage the furcations of said bar for holding said lever from longitudinal movement.

2. The combination with a housing for gear-shifting mechanism and a control lever fulcrumed thereon and projecting therein, of a bar slidable in a bearing in said housing in a direction transverse to the plane of initial movement of said lever from its neutral position, said bar having its inner end located below the fulcrum of said lever and adapted for engagement with said lever to hold the same in neutral position, and means upon said lever and engageable with said bar for holding said lever from outward longitudinal movement when said bar is in engagement with said lever.

3. In combination with a tubular support, a lever extending thereinto and supported within its length thereby for universal swinging movement, a guide through which said lever moves during its operation, a boss on said casing and formed with intersecting recesses one communicating with the interior of said tubular support, a longitudinally movable locking plunger within one of said recesses and capable of manual longitudinal movement to project into said tubular support to engage said lever to lock the same from movement within said guide, lock-controlled means carried by the other of said recesses for engaging said plunger to lock the same in engagement with the lever, and means for automatically moving said plunger longitudinally to its normal position on the release of said locking means.

4. In combination with a tubular support, a lever extending thereinto and supported within its length thereby for universal swinging movement, a boss on said casing and formed with intersecting recesses one communicating with the interior of said tubular support, a longitudinally movable locking plunger within one of said recesses, said plunger provided with a bifurcated end and capable of manual longitudinal movement to project into said tubular support to engage said lever and to receive a portion of the same within said bifurcated end to lock the lever from movement, lock-controlled means within the other of said recesses for engaging said plunger to lock the same in engagement with the lever, and means for automatically moving said plunger longitudinally to its normal position to permit of the movement of the lever on the release of said locking means.

5. In combination with a tubular support, a lever extending thereinto and supported within its length thereby for operative movement in two parallel planes and selective movement in a plane at right angles to said planes of operative movement, means with which said lever coöperates for preventing movement of the same in an operative plane when in its plane of selective movement, and a longitudinally movable lock controlled locking plunger carried by said support at substantially right angles to said lever and adapted for movement to project laterally into said support and engage said lever when in its plane of selective movement and to lock the same therein.

6. In combination with a lever fulcrumed within its length for operative movement in two planes parallel to each other, and for selective movement in a plane at right angles to said planes of operative movement, means with which said lever coöperates for preventing movement of the same in an operative plane when in its plane of selective movement, a tubular casing within which said lever extends below its point of fulcrum, a longitudinally movable locking plunger carried by said casing and adapted at one end to project inwardly into said casing for engaging said lever below its point of fulcrum to lock the same in its plane of selective movement, the opposite end of said plunger projecting exteriorly of said casing and providing a portion to be engaged for the manual movement of the plunger in one direction, and lock-controlled mechanism for engaging said plunger to retain the same in locked position, said lever when in locked position being prevented from operative movement, or removal from said casing.

In testimony whereof I affix my signature.

GURDON C. MATHER.